US009002612B2

(12) United States Patent
McNew

(10) Patent No.: US 9,002,612 B2
(45) Date of Patent: Apr. 7, 2015

(54) PREDICTION OF DRIVER-SPECIFIC CRUISE SPEED USING DYNAMIC MODELING

(75) Inventor: John Michael McNew, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 23 days.

(21) Appl. No.: 13/424,477

(22) Filed: Mar. 20, 2012

(65) Prior Publication Data
US 2013/0253797 A1 Sep. 26, 2013

(51) Int. Cl.
*B60T 8/32* (2006.01)
*B60W 30/14* (2006.01)
*B60W 50/00* (2006.01)
*G06N 99/00* (2010.01)

(52) U.S. Cl.
CPC ........ *B60W 30/143* (2013.01); *B60K 2310/244* (2013.01); *B60W 50/0097* (2013.01); *B60W 2050/0029* (2013.01); *B60W 2050/0083* (2013.01); *B60W 2540/30* (2013.01); *B60W 2550/141* (2013.01); *B60W 2720/10* (2013.01); *B60W 2720/103* (2013.01); *G06N 99/005* (2013.01); *Y02T 10/84* (2013.01)

(58) Field of Classification Search
USPC .......... 701/93, 117, 1, 533, 70, 23, 33.4, 424, 701/117.1; 180/170
See application file for complete search history.

(56) References Cited

U.S. PATENT DOCUMENTS

| | | | |
|---|---|---|---|
| 6,317,686 B1 * | 11/2001 | Ran ............................... | 701/533 |
| 6,836,719 B2 | 12/2004 | Andersson et al. | |
| 6,990,401 B2 | 1/2006 | Neiss et al. | |
| 7,308,961 B2 | 12/2007 | Satou et al. | |
| 7,400,963 B2 | 7/2008 | Lee et al. | |
| 7,424,868 B2 | 9/2008 | Reckels et al. | |
| 7,739,023 B2 | 6/2010 | Lee | |
| 2003/0093209 A1 * | 5/2003 | Andersson et al. .............. | 701/93 |
| 2007/0150159 A1 | 6/2007 | Linden | |
| 2008/0120025 A1 * | 5/2008 | Naitou et al. .................. | 701/207 |
| 2008/0195569 A1 | 8/2008 | Norris et al. | |
| 2008/0270001 A1 * | 10/2008 | Seto et al. ........................ | 701/93 |
| 2009/0259354 A1 | 10/2009 | Krupadanam et al. | |
| 2010/0198450 A1 | 8/2010 | Shin | |
| 2010/0204896 A1 * | 8/2010 | Biondo et al. ................... | 701/93 |

(Continued)

OTHER PUBLICATIONS

Bengtsson, J. (Nov. 2001). "Adaptive Cruise Control and Driver Modeling" Department of Automatic Control, Lund Institute of Technology, Sweden, pp. 1-91.
Muller, R. et al. (1992). "Intelligent Cruise Control With Fuzzy Logic" Proceedings of the Intelligent Vehicles '92 Symposium, pp. 173-178.

(Continued)

*Primary Examiner* — Thomas Tarcza
*Assistant Examiner* — Kevin Myhre
(74) *Attorney, Agent, or Firm* — Oblon, McClelland, Maier & Neustadt, L.L.P.

(57) ABSTRACT

A controller for predicting cruising speeds of a vehicle includes a processor and an extracting unit to extract feature data from segments of a prior trajectory of the vehicle, the feature data including cruising speeds of the vehicle and predictive feature data. The controller also includes a model generator to generate a probabilistic model associating the predictive feature data with the cruising speeds of the vehicle and a predicting unit to predict a cruising speed of the vehicle for a target segment, which is an upcoming cruising segment of the vehicle, by conditioning the probabilistic model on real-time predictive feature data of segments of a current trajectory.

28 Claims, 6 Drawing Sheets

(56) References Cited

U.S. PATENT DOCUMENTS

2011/0184642 A1* 7/2011 Rotz et al. .................. 701/201
2012/0010767 A1* 1/2012 Phillips et al. ............... 701/22

OTHER PUBLICATIONS

Kozica, E. (2005). "Look Ahead Cruise Control: Road Slope Estimation and Control Sensitivity". KTH Signals Sensors and Systems, pp. 1-49.

* cited by examiner

PREDICTION OF DRIVER-SPECIFIC CRUISE SPEED USING DYNAMIC MODELING

BACKGROUND

1. Field of Disclosure

This application relates to predicting a driver-specific cruising speed based on a probabilistic model generated based on collected data indicating the driving style of the driver.

2. Discussion of the Related Art

The "background" description provided herein is for the purpose of generally presenting the context of the disclosure. Work described herein, to the extent it is described in this background section, as well as aspects of the description which may not otherwise qualify as prior art at the time of filing, are neither expressly or implicitly admitted as prior art.

Conventional cruise control systems allow a driver to set a desired cruising speed at which the vehicle will remain until the driver presses a pedal or a lever to bring the vehicle back into manual operation mode. Such systems are most helpful to drivers on highways, where vehicles maintain a constant cruising speed, to remain at the cruising speed without manually controlling the vehicle.

However, such conventional cruise control systems require input from the driver to select or change cruising speed, and, therefore, are of limited use in urban driving situations, where the stop and go motion of driving makes setting the cruise control speed very cumbersome. Drivers are also not always aware of their current driving style and driving conditions and may not always select an optimal cruising speed under the circumstances.

Furthermore, conventional cruise control systems respond in real-time, meaning that the driver may only set the cruising speed for the current conditions, and not, for example, for an upcoming road segment. Finally, conventional cruise control systems utilize the cruising speed set by the driver for only one purpose: to control vehicle actuators such that the vehicle remains at the cruising speed. The set cruising is not used by other applications within the vehicle.

SUMMARY

As described above, the necessity for drivers to manually set the cruising speed in conventional cruise control systems is cumbersome and inconvenient.

This application relates to a system and associated methodology for predicting driver-specific cruising speed by dynamically modeling driving behavior and environment and without requiring the driver to select a cruising speed. Thus, the driver is not inconvenienced by having to set and modify a cruising speed. Furthermore, because the system monitors the driver's current driving style and situation, the cruising speed is accurate for each cruising segment even if the driving style or situation changes suddenly.

An exemplary controller for predicting the cruising speeds of a vehicle includes a processor and an extracting unit, a model generator, and a predicting unit. The extracting unit is configured to extract feature data from segments of a prior trajectory of a vehicle. The feature data include cruising speeds of the vehicle and predictive feature data. The model generator is configured to generate a probabilistic model associating the predictive feature data with the cruising speeds of the vehicle. The predicting unit is configured to predict a cruising speed of the vehicle for a target segment, which is an upcoming cruising segment of the vehicle, by conditioning the probabilistic model on real-time predictive feature data of segments of a current trajectory of the vehicle.

The predicting unit may be configured to condition the probabilistic model on a launch model of an initial segment of the segments of the current trajectory of the vehicle, where the target segment follows the initial segment.

In one aspect, the controller includes a collecting unit, a segmenting unit, and a selecting unit. The collecting unit is configured to collect trajectory data of the vehicle, and the segmenting unit is configured to segment the collected trajectory data into segments. The selecting unit is configured to select one or more predictive features, and the extracting unit is configured to extract feature data corresponding to the selected one or more predictive features from the segments of the current trajectory as the real-time predictive feature data. The model generator is configured to generate the probabilistic model based on the feature data corresponding to the selected one or more predictive features. The controller may include an updating unit configured to update the probabilistic model based on the real-time predictive feature data and an actual cruising speed of the vehicle for the target segment.

In another aspect, the controller may include a driver identification unit and a transmitter. The driver identification unit is configured to identify a driver of the vehicle and associate the generated probabilistic model with the identified driver. The transmitter is configured to transmit a message in response to a determination that the actual cruising speed is different by a predetermined threshold from a predicted cruising speed for the target segment based on the probabilistic model associated with the identified driver. The predetermined threshold may be a statistically significant difference between the actual cruising speed and the predicted cruising speed based on the probabilistic model associated with the identified driver.

In yet another aspect, the controller may include a vehicle identification unit and a transmitter. The vehicle identification unit configured to identify the vehicle and associate the generated probabilistic model with the vehicle. The transmitter is configured to transmit a message in response to a determination that the actual cruising speed is different by a predetermined threshold from a predicted cruising speed for the target segment based on the probabilistic model associated with the vehicle.

The updating unit may also be configured to identify outlier feature data corresponding to unusual traffic patterns or unusual driving patterns and remove the identified outlier feature data from the real-time predictive feature data used to update the probabilistic model.

In yet another aspect, the predicting unit may be configured to predict the cruising speed of the vehicle for the target segment by conditioning the probabilistic model on a sequence number of a trajectory including the target segment relative to sequential trajectories forming a navigation path of the vehicle. The predicting unit may also be configured to predict the cruising speed of the vehicle for the target segment by conditioning the probabilistic model on a cruising speed of a cruising segment of the current trajectory, the current trajectory being a trajectory prior to a trajectory including the target segment. Further, the predicting unit may be configured to predict the cruising speed of the vehicle for the target segment by conditioning the probabilistic model on a deceleration model of a last segment of the current trajectory, the current trajectory being a trajectory prior to a trajectory including the target segment.

The deceleration model may be a time-based polynomial model, a state-space-based linear model, or a state-space-based non-linear model. The launch model may also be a time-based polynomial model, a state-space-based linear model, or a state-space-based non-linear model. When an actual cruising speed for the target segment is reached by the vehicle, the controller may designate an upcoming cruising segment as a next target segment for cruising speed prediction.

In yet another aspect, the vehicle includes a Global Positioning System (GPS) and a map database containing speed limit information, the feature data includes environmental indicators, road geometry, a road location, road conditions, and a speed limit. The environmental indicators include one or more of road surface conditions, time of day, light level, and temperature, while the road geometry includes one or more of road inclination values and radius of road curvature values. The predicted cruising speed is represented as an offset from the speed limit in the map database. The speed limit may be extracted from the map database included in the vehicle or may be extracted from speed limit signs captured by one or more cameras that may be included in the vehicle. For road segments where a map database is not available or does not contain speed limit information, the model generator may be configured to generate the probabilistic model for each new road segment driven by the vehicle and associate the probabilistic model with the respective road segment. In this configuration, the predicted speed is not relative to a speed limit. The model generator may perform kernel density estimation, least absolute shrinkage and selection operator (LASSO) linear regression, or boosted tree regression to generate the probabilistic model.

The predicted cruising speed may be a probability density function. The controller may include a warning unit configured to integrate the probability density function to determine a cumulative distribution function, determine a cruising speed value at a user-selected certainty threshold of the cumulative distribution function, and issue a warning in response to the actual cruising speed exceeding the determined cruising speed value.

Alternatively, the predicted cruising speed may be a value. The predicting unit may be further configured to predict the cruising speed for the target segment as a mean of actual cruising speeds of prior segments when no feature data has been extracted in the current trajectory. The controller may output the predictive cruising speed to a client application.

In yet another aspect, the controller may include an eco-acceleration cruise controller that receives the predicted cruising speed and determines an acceleration sequence to achieve the predicted cruising speed and maximize fuel efficiency.

BRIEF DESCRIPTION OF THE DRAWINGS

A more complete understanding of the disclosure may be attained by reference to the drawings, in which.

DETAILED DESCRIPTION

Figure 1:
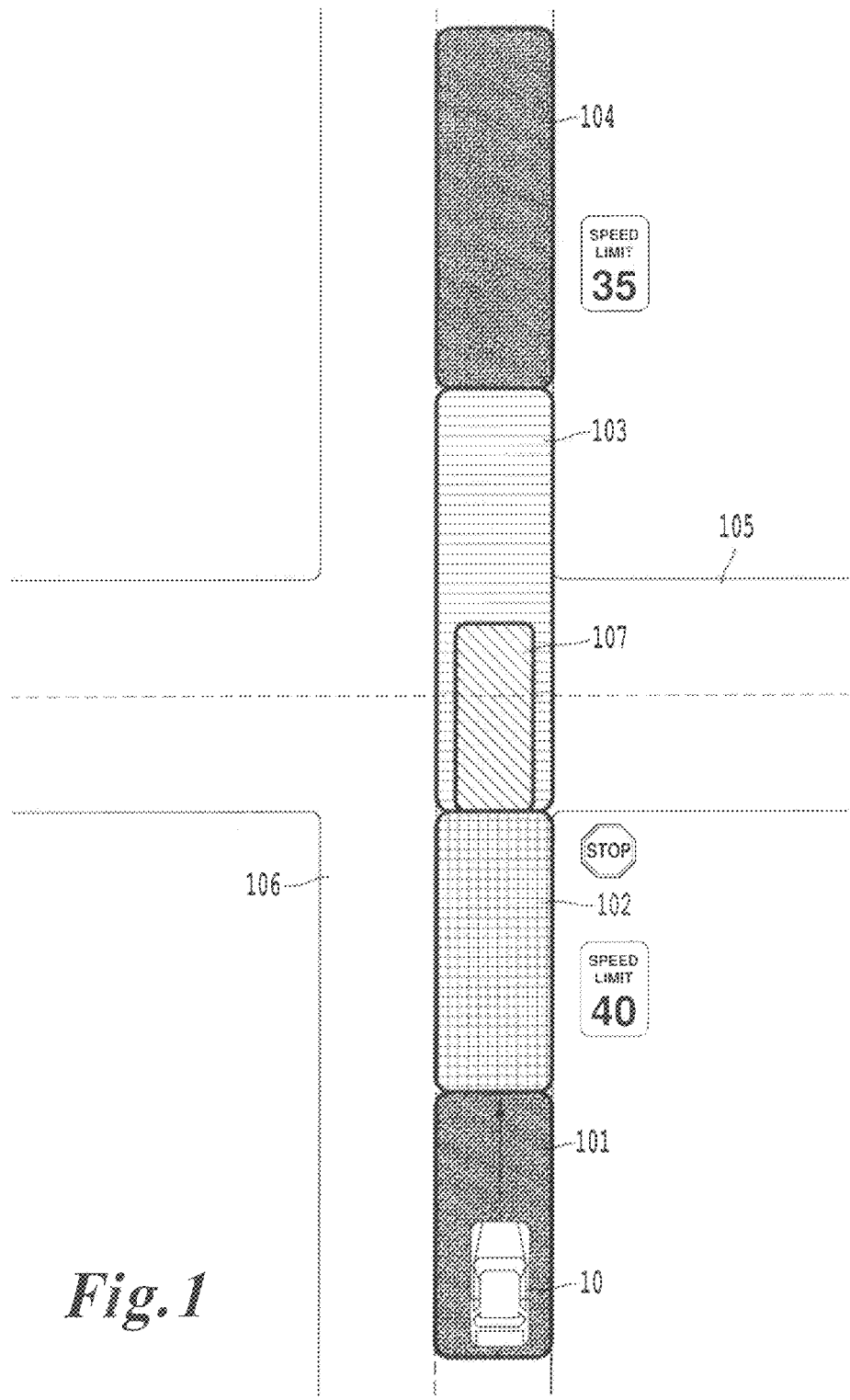
FIG. 1 shows an exemplary driving situation of an exemplary vehicle including a controller for predicting cruising speeds of the vehicle.

Like reference numerals in the drawings and the description thereof designate identical or corresponding parts/steps throughout the several views. Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure in which functions may be executed out of order from that shown or discussed, including substantially concurrently or in reverse order, depending upon the functionality involved.

The following is a glossary of terms used consistently throughout the application. The term trajectory refers to a path of a vehicle from a stopped state to the next stopped state. Each trajectory is composed of two or more segments, each segment corresponding to a speed profile of that part of the trajectory, such as an acceleration segment, a cruising segment, and a deceleration segment. The term target segment refers to an upcoming cruising segment for which a cruising speed prediction is made, while the term target trajectory refers to the trajectory including a target segment.

FIG. 1 depicts an exemplary driving situation of an exemplary vehicle 10 including a controller for predicting cruising speeds of the vehicle 10. The vehicle 10 is depicted in the cruising segment 101, moving toward deceleration segment 102. The deceleration segment 102 ends at a stop sign at the intersection with road sections 105 and 106. The deceleration segment 102 is the last segment of a trajectory which includes cruising segment 101 and deceleration segment 102.

After passing the stop sign, the vehicle 10 enters the acceleration segment 103, which is the first segment of a new trajectory. Within acceleration segment 103, launch segment 107 represents the initial part of acceleration segment 103 during which the driver of vehicle 10 first begins to accelerate after passing the stop sign. Finally, the vehicle 10 enters cruising segment 104, at which time the vehicle 10 has reached a desired cruising speed.

The vehicle 10 can include a Global Positioning System (GPS) to identify the road section 106 on which the vehicle 10 is traveling, as well as intersecting road section 105. The vehicle 10 can also include a stored map database to determine the speed limit of the road section 106 on which the vehicle 10 is traveling, as well as the speed limits of intersecting road section 105, and the speed limits of upcoming road sections upon which the vehicle 10 is likely to travel next. Further, the vehicle 10 can use external sensors or communications to determine surrounding traffic, weather, and road conditions. Furthermore, the vehicle 10 can include one or more cameras to capture speed limit signs, from which the speed limit of the road segment currently traveled by the vehicle 10 can be extracted.

Figure 2:
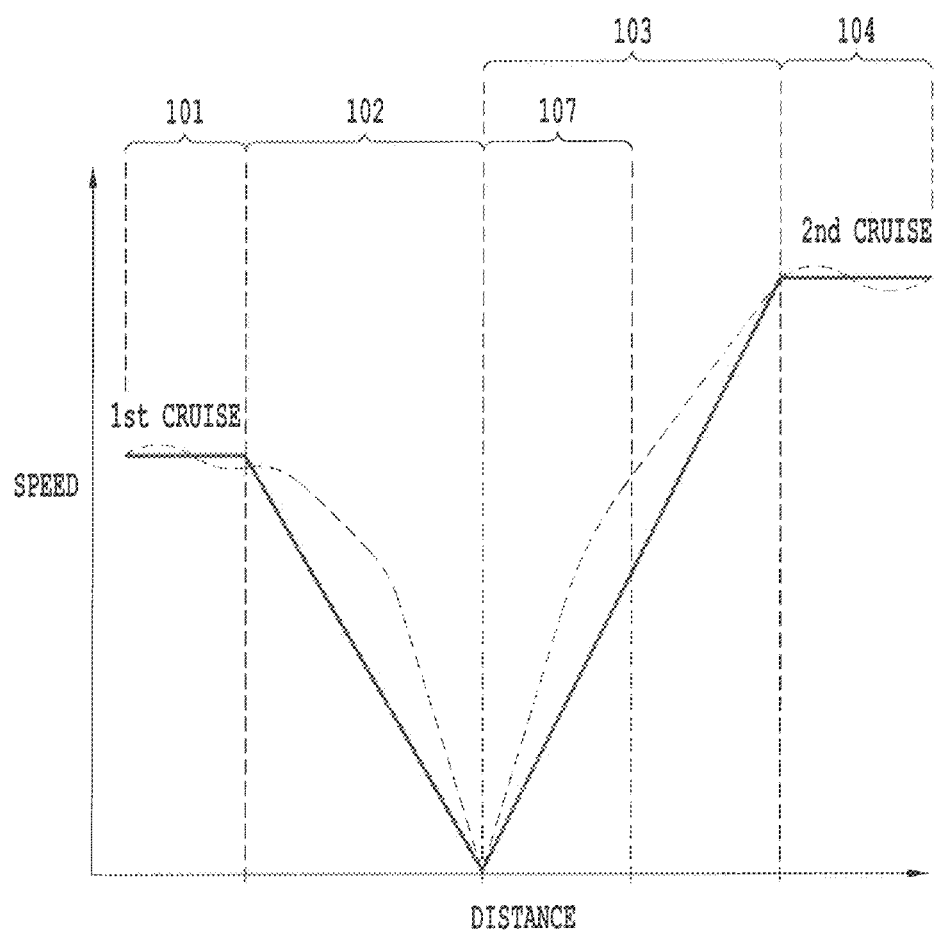
FIG. 2 shows an exemplary plot of speed against distance of the exemplary vehicle in the exemplary driving situation shown in FIG. 1.

FIG. 2 shows a graph charting the speed of vehicle 10 against the distance traveled along the road sections illustrated in FIG. 1. The distance measurement begins at the point where vehicle 10 is illustrated in FIG. 1, during cruising segment 101. The dashed line in FIG. 2 shows actual data collected by the vehicle 10, while the solid line represents the feature data extracted by the controller from the collected actual data. The solid line represents a fit or estimate of the actual data.

The feature data extracted from cruising segments 101 and 104 includes the cruising speed. The feature data extracted from the deceleration segment 102 includes a deceleration model based upon the deceleration rate, while the feature data extracted from the acceleration segment 103 includes a launch model based upon the acceleration rate during the launch segment 107. As such, the controller processes the collected speed data and generates the feature data shown as the solid line in FIG. 2 in real-time, as the vehicle 10 travels along the road sections shown in FIG. 1.

Figures 3, 4:
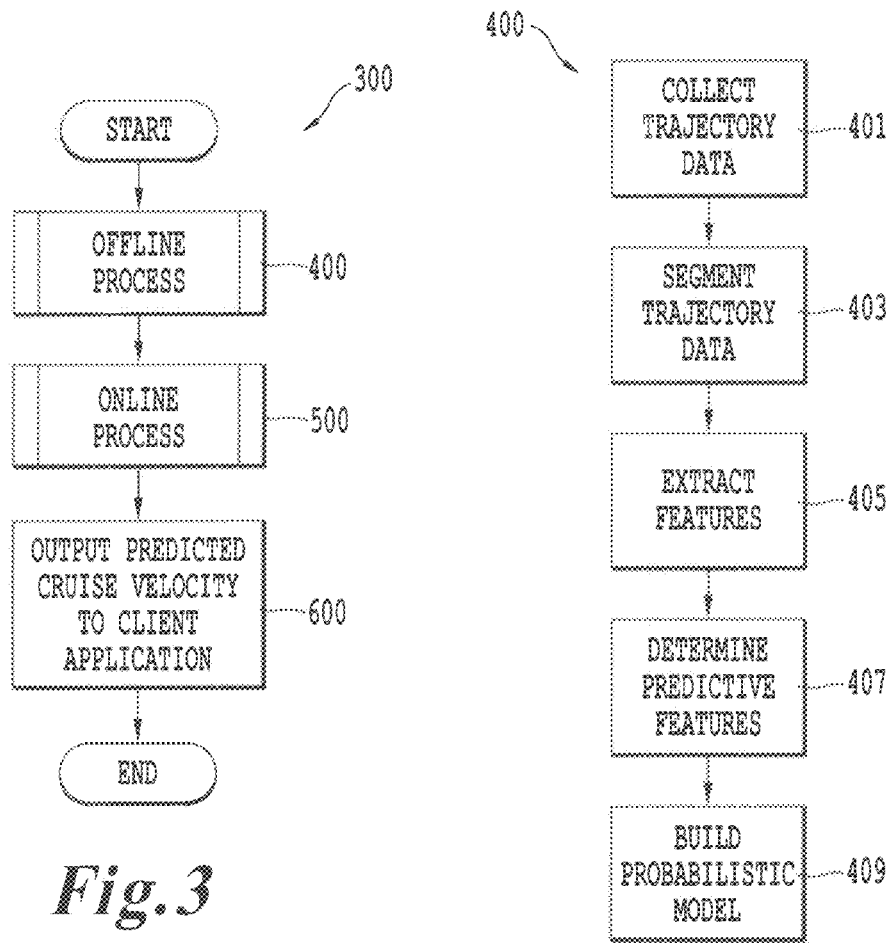
FIG. 3 is a flowchart of a cruising speed prediction algorithm.
FIG. 4 is a flowchart of an offline process included in a cruising speed prediction algorithm.

FIG. 3 shows the cruise speed prediction process 300 executed by the controller within the vehicle 10. At the start of the cruise speed prediction process 300, the controller executes an offline process 400, discussed below with reference to FIG. 4. Generally, the offline process 400 may be executed when the vehicle 10 is stopped, parked, or when the controller and the computing resources required by the controller are not executing other processes. The offline process 400 processes collected data from prior drives in order to build and update a probabilistic model that is used during the online process 500.

Figure 5:
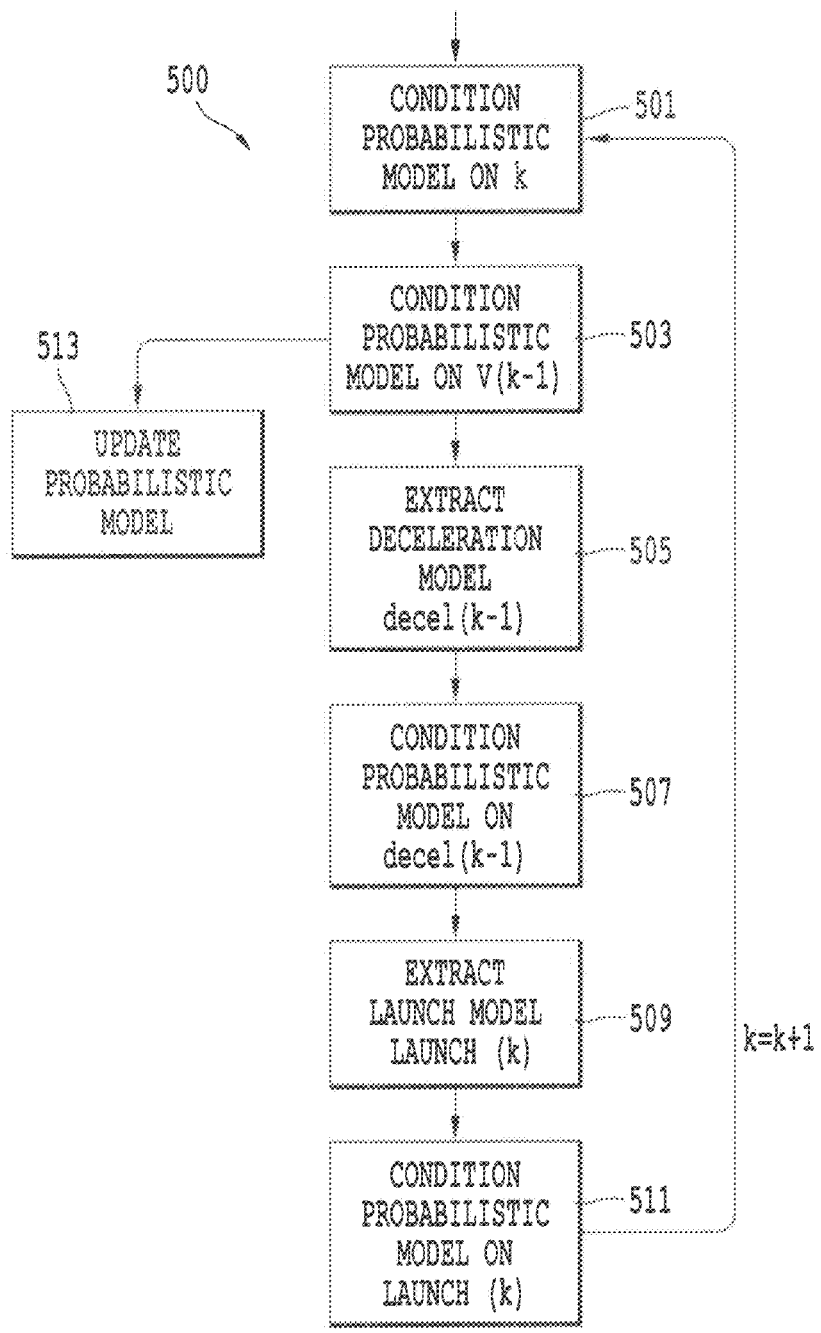
FIG. 5 is a flowchart of an online process included in a cruising speed prediction algorithm.

The online process 500, discussed below with reference to FIG. 5, is executed in real-time as the vehicle 10 is driving and a predicted cruising speed for an upcoming segment is required by a client application. The online process 500 collects, segments, and extracts real-time feature data, such as cruising speeds of cruising segments, and deceleration and launch models of deceleration and acceleration segments, respectively. Using the probabilistic model generated through the offline process 400, the online process 500 determines a predicted cruising speed for an upcoming target cruising segment using the collected real-time feature data. The predicted cruising speed is then output in step 600 from the controller to a client application, such as an eco-acceleration cruise control application, a driver-specific and driving-mode-specific speed limit warning or cruise control application, or a anti-theft warning application.

The predicted cruising speed is output in two possible modes, depending upon the sensing capabilities of the vehicle 10. If the vehicle 10 includes a Global Positioning System (GPS) and a map database containing speed limit information and stop locations, the predicted cruising speed may be output as an offset from the posted speed limit in effect at the location of the target cruising segment. Alternatively, the predicted cruising speed may be output as a percentage of the posted speed limit in effect at the location of the target cruising segment.

Furthermore, if the vehicle 10 includes a Global Positioning System (GPS) and/or a map database, the controller collects road conditions and road geometry as part of the feature data to be included in the probabilistic model. The controller may then collect and use road conditions and road geometry collected in real-time in the online process 500 to determine a predicted cruising speed.

However, if the vehicle 10 has GPS but does not have a map database containing speed limits and stop locations, the controller may create and use separate probabilistic models for each traveled road segment using the GPS function. Also, the predicted cruising speed is output as an absolute value, not an offset or percentage of the posted speed limit.

In one exemplary embodiment, the controller uses external sensors or communications to monitor traffic conditions, such as slower average speeds due to congested traffic. In this case, traffic flow data is collected and used to build the probabilistic model in offline process 400 and collected in real-time to predict the cruising speed in online process 500. The controller thus adjusts the predicted cruising speed to reflect the congested traffic conditions at the location of the target cruising segment.

In another embodiment, the vehicle 10 includes a driver identification unit to identify one or more drivers of the vehicle 10. In this embodiment, offline process 400 is executed for each individual driver to build a probabilistic model corresponding to and associated with each driver. The online process 500 uses the probabilistic model corresponding to the driver identified as driving the vehicle 10 at the time of execution of the online process 500.

In yet another embodiment, the probabilistic model generated in the offline process 400 is stored outside the vehicle 10. In this case, the vehicle includes a vehicle identification unit to identify the vehicle 10 and associate the probabilistic model with the vehicle 10 when retrieving and storing the probabilistic model.

In the embodiments including the driver identification unit and/or the vehicle identification unit, the vehicle 10 also includes a transmitter which transmits a message when the actual cruising speed differs from the predicted cruising speed calculated based on the probabilistic model associated with the identified driver and/or the vehicle. Specifically, the transmitter transmits a message when the difference between the actual cruising speed and the predicted cruising speed is statistically significant. In these embodiments, the client application may be a anti-theft warning system, which issues a warning when an unauthorized driver may be driving the vehicle 10.

In yet another embodiment, the controller includes an eco-acceleration cruise controller which receives the predicted cruising speed output at step 600 and determines an acceleration sequence to achieve the predicted cruising speed while maximizing fuel efficiency.

FIG. 4 illustrates the offline process 400. At the start of the offline process 400, trajectory speed data is collected for each stop-to-stop driving interval at step 401. The collected trajectory speed data is segmented in step 403. The segmentation of the trajectory data divides the continuous speed data for each stop-to-stop driving interval into, for example, one or more acceleration segments when the vehicle 10 is building speed, one or more cruising segments when the vehicle 10 remains at substantially the same speed, and one or more deceleration segments when the vehicle 10 is slowing down. Once the segments of the trajectory data are identified, the controller extracts feature data from each segment in step 405. As described above with respect to FIG. 2, feature data includes the cruising speed of cruising segments, the deceleration model of deceleration segments, and the launch model of acceleration segments. For example, the deceleration and launch models may be dynamical models such as time-based polynomial models, state-space-based linear models, or state-space-based non-linear models. Furthermore, feature data may include the surrounding weather, traffic, light, and road geometry and conditions collected by external sensors included in the vehicle 10.

Based on the feature data extracted in step 405, the controller in step 407 determines which features are predictive of the cruising speed. For example, after collecting trajectory data over a large enough set of trajectories, the controller identifies one or more of several feature data values associated with each trajectory that are directly associated with the cruising speed achieved in that trajectory. The feature data values that may be identified as predictive include one or more of the following: the sequence number of the trajectory within the entire trip, the total elapsed time of the trip, the cruising speed of a previous trajectory, the deceleration model of the previous trajectory, and the launch model of the target trajectory for which a cruising speed is to be predicted. Other feature data values that may be identified as predictive include traffic environment data, including traffic congestion, speed limit, weather, road conditions, road geometry, and light level at the driving location. The feature set may be further expanded or refined using various mathematical manipulations including differences, squares, logarithms, correlations between features, etc. The controller may store a minimum level of association above which a given feature data value is determined predictive. Whichever of the above-listed feature data values collected in prior trajectories is determined to have a level of association with cruising speed above the stored minimum level of association with cruising speed is determined to be a predictive feature in step 407.

In step 409, the controller builds a probabilistic model correlating the feature data values identified as predictive in step 407 with cruising speed predictions. Depending on the type and accuracy of the cruising speed predictions required by the client application requesting the cruising speed predictions, different probabilistic modeling methods may be used to build the probabilistic model, including kernel density estimation, least absolute shrinkage and selection operator (LASSO) linear regression, or boosted tree regression. For example, if only values, and not a probability density functions, are required by the client application as the cruising speed predictions, then a regression model is generated in step 409 as the probabilistic model. The probabilistic model built in step 409 of the offline process 400 is stored in memory provided within or outside the controller, to be used during the online process 500.

FIG. 5 shows the online process 500, which uses the probabilistic model built in step 409 of the offline process 400. In general, the online process 500 collects, segments, and extracts real-time predictive feature data and conditions the probabilistic model on each newly collected piece of predictive feature data, as it is collected. As such, the online process 500 generates a series of increasingly refined cruising speed predictions for an upcoming target segment. Each consecutive one in the series of cruising speed predictions is generated based on newly collected predictive feature data.

The online process 500 shown in FIG. 5 assumes that the feature data values identified as predictive in the offline process 400 include: the sequence number of the target trajectory including the upcoming target segment within the entire trip, the cruising speed of a previous trajectory, the deceleration model of the previous trajectory, and the launch model of the target trajectory including the upcoming target segment. Therefore, the probabilistic model generated by the offline process 400 and used by the online process 500 correlates these predictive features with cruising speed predictions.

Step 501 of the online process conditions the probabilistic model on sequence number k, which represents the sequence number of the target trajectory including the upcoming target segment within the entire trip, which begins when the vehicle 10 was started. For example, if the vehicle 10 has gone through two stop-to-stop trajectories since being started and the upcoming target segment is in the third trajectory, k is equal to 3. The sequence number k has predictive qualities with respect to a cruising speed of an upcoming target segment because the amount of time, as represented by stop-to-stop trajectories, that the driver of vehicle 10 has been driving in the trip may affect the driving style and, thus, the cruising speed prediction.

Because the sequence number of the target trajectory is known prior to other feature data values being collected in real-time, the sequence number k is the first feature data value upon which the probabilistic model is conditioned to generate a first cruising speed prediction. Specifically, the probabilistic model may include a joint probability distribution $p(v(k), k)$, where $v(k)$ is the cruising speed prediction and k is the sequence number. When a value of sequence number k of the target trajectory is known, the joint probability distribution $p(v(k), k)$ is conditioned on the value of k to yield a probability density function PDF $p(v(k)|k)$, which is a probability curve over possible speeds being the predicted cruising speed when k is equal to the sequence number of the target trajectory. Depending upon the needs of the client application requesting the cruising speed prediction, the entire PDF $p(v(k)|k)$ may be output to the client application, or just a single speed prediction may be output to the client application represented as either the mode of the PDF, $\max(p(v(k)|k))$ (i.e., the speed having the highest probability) or expected value of the PDF, $E(p(v(k)|k))$. In either case, the predicted cruising speed for the target trajectory output as a result of step 501 is the first cruising speed prediction for the target trajectory k.

After the probabilistic model has been conditioned on sequence number k in step 501 to generate an initial cruising speed prediction, the controller executes step 503 by conditioning the probabilistic model on $v(k-1)$, which is the cruising speed of the trajectory immediately preceding the target trajectory (i.e., $v(k-1)$ representing the cruising speed of the trajectory having sequence number k−1). Step 503 may only be executed by the controller when the vehicle 10 reaches the cruising speed of the trajectory immediately preceding the target trajectory. At that time, the controller collects the cruising speed in real-time and conditions the probabilistic model using the collected cruising speed value. Similarly to the conditioning process described above with respect to the sequence number k, the probabilistic model includes a joint probability distribution $p(v(k), v(k-1))$, where $v(k)$ is the cruising speed prediction for the target trajectory and $v(k-1)$ is the cruising speed of the trajectory immediately preceding the target trajectory.

When the cruising speed of the trajectory immediately preceding the target trajectory $v(k-1)$ is reached and measured by the vehicle 10, the joint probability distribution $p(v(k), v(k-1))$ included in the probabilistic model is conditioned on the measured cruising speed $v(k-1)$ to yield a PDF $p(v(k)|v(k-1))$, which is a probability curve over possible speeds being the predicted cruising speed of the target trajectory, when the cruising speed of the immediately preceding trajectory is the measured cruising speed $v(k-1)$. As discussed above, the entire PDF $p(v(k)|v(k-1))$ may be output to the client application, or just a single speed prediction derived from the probabilistic model. In either case, the predicted cruising speed for the target trajectory output as a result of step 503 is the second cruising speed prediction for the target trajectory k and represents a more refined cruising speed prediction than the first prediction generated in step 501.

After the probabilistic model has been conditioned on the cruising speed of the immediately preceding trajectory $v(k-1)$ in step 503 to generate a second, refined cruising speed prediction, the controller executes step 505 by estimating the deceleration model $\text{decel}(k-1)$, which is the deceleration model extracted from trajectory data collected during the deceleration segment of the trajectory immediately preceding the target trajectory. As the vehicle 10 enters the deceleration segment of the trajectory immediately preceding the target trajectory, the controller collects trajectory data, including the speed profile of the vehicle 10 over time, and extracts feature data from the collected trajectory data, including the deceleration model of the deceleration segment, as shown by reference 102 in FIG. 2. In this way, the deceleration model decel(k−1) of the trajectory immediately preceding the target trajectory is estimated in step 505. For example, the deceleration model decel(k−1) represents the driving style of vehicle 10, such as rushed or relaxed, based upon the deceleration rate of the vehicle 10.

Next, the controller executes step 507 by conditioning the probabilistic model on the deceleration model decel(k−1), which is the deceleration model extracted from trajectory data collected during the deceleration segment of the trajectory immediately preceding the target trajectory. The probabilistic model includes a joint probability distribution p(v(k), decel(k−1)), where v(k) is the cruising speed prediction for the target trajectory and decel(k−1) is the deceleration model of the immediately preceding trajectory.

When the deceleration model of the trajectory immediately preceding the target trajectory decel(k−1) is extracted by the controller, the controller executes step 505 by conditioning the joint probability distribution p(v(k), decel(k−1)) included in the probabilistic model on the extracted deceleration model decel(k−1) to yield a PDF p(v(k)|decel(k−1)), which is a probability curve over possible speeds being the predicted cruising speed of the target trajectory, when the deceleration of the immediately preceding trajectory is the extracted deceleration model decel(k−1). The entire PDF p(v(k)|decel(k−1)) may be output to the client application, or just the speed represented by the PDF p(v(k)|decel(k−1)) as having the highest probability of being the predicted cruising speed may be output, depending upon the needs of the client application. In either case, the predicted cruising speed for the target trajectory output as a result of step 505 is a third cruising speed prediction for the target trajectory k and represents a more refined cruising speed prediction than the first and second predictions generated in steps 501 and 503, respectively.

After traveling through the deceleration segment of the immediately preceding trajectory upon which deceleration model decel(k−1) is based, the vehicle 10 comes to a stop, which delineates the boundary between the trajectory immediately preceding the target trajectory and the target trajectory. Once the vehicle 10 begins to accelerate after the stop, the vehicle 10 has entered an acceleration segment of the target trajectory. At this time, the controller executes step 509 by estimating the launch model launch(k) of the target trajectory (i.e., the trajectory having sequence number k).

Specifically, during the initial part of the acceleration segment of the target trajectory, the controller collects trajectory data, including speed data, over time and extracts from the collected trajectory data feature data, including the launch model of the vehicle 10. Step 509 is executed during launch segment 107 shown in FIGS. 1 and 2. As discussed above with respect to the deceleration model decel(k−1), launch model launch(k) represents, for example, the driving style of vehicle 10, such as rushed or relaxed, based upon the acceleration rate of the vehicle 10.

When the launch model launch(k) of the acceleration segment of the target trajectory is extracted, the controller executes step 511 by conditioning the probabilistic model on the launch model launch(k), which is the launch model extracted from trajectory data collected during the launch segment of the target trajectory. The probabilistic model includes a joint probability distribution p(v(k), launch(k)), where v(k) is the cruising speed prediction for the target trajectory and launch(k−1) is the launch model of the target trajectory.

The controller executes step 511 by conditioning the joint probability distribution p(v(k), launch(k)) included in the probabilistic model on the extracted launch model launch(k) to yield a PDF p(v(k)|launch(k)), which is a probability curve over possible speeds being the predicted cruising speed of the target trajectory, when the acceleration of the target trajectory is the extracted launch model launch(k). The entire PDF p(v(k)|launch(k)) may be output to the client application, or just the speed represented by the PDF p(v(k)|launch(k)) as having the highest probability of being the predicted cruising speed may be output, depending upon the needs of the client application. In either case, the predicted cruising speed for the target trajectory output as a result of step 511 is the fourth and final cruising speed prediction for the target trajectory k and represents the most accurate cruising speed prediction than the first, second, and third predictions generated in steps 501, 503, and 507, respectively.

After the predicted cruising speed is output to the client application in step 511, the target trajectory sequence number k is incremented by 1 and the online process 500 re-starts at step 501 by conditioning the probabilistic model on sequence number k+1 of the target trajectory. Thereafter, when the vehicle 10 reaches and measures cruising speed in trajectory k, the online process 500 executes step 503 by conditioning the probabilistic model on the measured cruising speed v(k) to generate a predicted cruising speed v(k+1) for target trajectory k+1. After the cruising speed v(k) of trajectory k is measured, the controller updates the probabilistic model in step 513 using the real-time feature data collected through online process 500. Specifically, the controller updates the joint probability distributions p(v(k), k), p(v(k), v(k−1)), p(v(k), decel(k−1)), and p(v(k), launch(k)) to reflect the correspondence of the sequence number k, the cruising speed of the previous trajectory v(k−1), the deceleration model of the previous trajectory decel(k−1), and the launch model of the target trajectory launch(k), respectively, with the measured cruising speed v(k).

In one embodiment, step 513 includes identifying outlier feature data, such as outlier cruising speeds and deceleration and launch models, corresponding to unusual traffic or driving patterns. The identified outlier feature data is removed from the set of real-time feature data used to update the probabilistic model in step 513.

In another embodiment, the controller uses an alternate method to predict the cruising speed of the target trajectory in the case when feature data is not extracted or collected in real-time. Specifically, in such a case, the controller predicts the cruising speed of the target trajectory by calculating the mean of cruising speeds collected from prior trajectories.

In another embodiment, step 505 and/or step 509 includes extraction of additional features together with the corresponding deceleration or launch model. However, it should be appreciated that the extraction of these additional features can be performed during other segments, so as to be taken into account for predictions. These additional features include road geometry and condition features, as well as environmental features, which can be related to the road condition features. Such environmental features include weather, road surface conditions (e.g., wet, slippery, icy, hot, cold), time of day, light level, and atmospheric temperature, which are obtained through corresponding sensors/controllers, such as GPS clocks, barometers, thermometers, photoelectric sensors, and traction-control devices. Some of these features (e.g., weather and atmospheric temperature) can also be obtained through an Internet connection.

Corresponding values are communicated through the vehicle 10 through a network, which is discussed in further detail below. Road geometry and condition features include road inclination values and radius of road curvature, which can be obtained through GPS mapping or acceleration and gyroscopic sensors. Further, a road speed limit is preferably included with the additional features, which can be obtained by way of the GPS map database, or by direct image capture from an on-board camera. Other road condition features, such as composition (e.g., packed gravel vs. asphalt vs. concrete), can also be extracted through the use of the aforementioned traction-control devices or through camera systems. In this embodiment, step 511 includes conditioning the probabilistic model on the additional features extracted in step 505 and/or step 509, as well as conditioning the probabilistic model on the deceleration or launch model, as discussed above.

In yet another embodiment, the conditioning of the probabilistic model in steps 501, 503, 507, and 511 is done by generating regression models over different feature sets. Specifically, regression models are conditioned in place of the joint probability distributions in the online process 500 when the client application requires cruising speed predictions as values, as opposed to cruising speed predictions as probability density functions. In such a case, conditioning the regression models instead of the join probability distributions is a more efficient way to generate the cruising speed predictions required by the client application.

Figure 6:
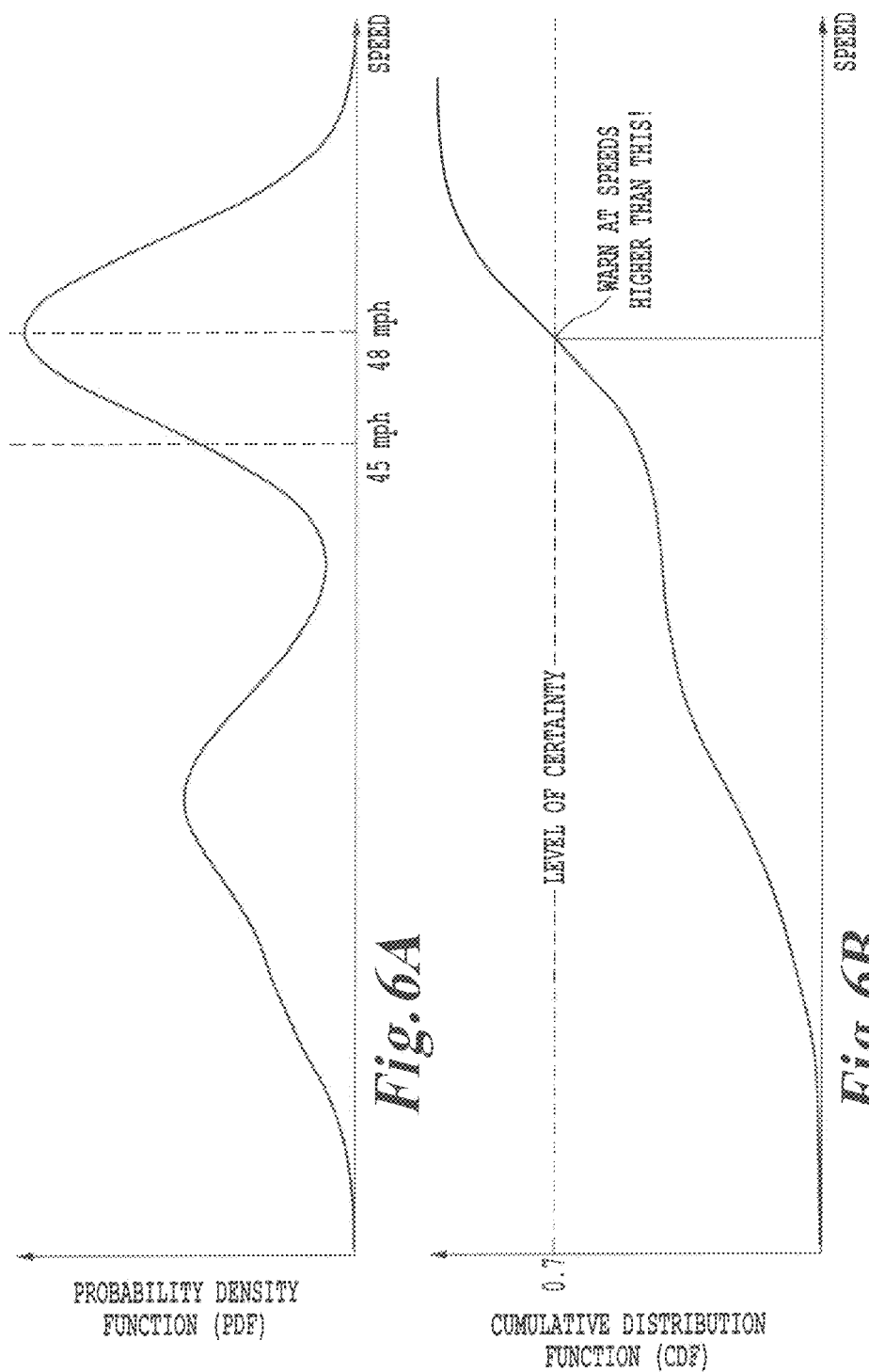
FIG. 6A is an exemplary plot of a probability density function.
FIG. 6B is an exemplary plot of a cumulative distribution function.

Referring now to FIG. 6A, an exemplary PDF is shown, such as may be generated by the conditioning steps 501, 503, 507, and 511 of the exemplary online process 500 shown in FIG. 5. The probability curve represents the probability (y axis) that a given speed (x axis) is the predicted cruising speed. In the exemplary PDF shown in FIG. 6A, the mode (i.e., speed having the highest probability of being the predicted cruising speed) is 48 miles per hour. The expected value of the speed, often referred to as the mean, is 45 miles per hour. As discussed above with respect to conditioning steps 501, 503, 507, and 511 of FIG. 5, either the entire PDF or the speed value having the highest probability of being the predicted cruising speed (48 miles per hour in the exemplary PDF of FIG. 6A) is output to the client application.

In an exemplary embodiment, the client application is a speed limit warning system. In this embodiment, the driver of vehicle 10 may select a level of certainty percentage at which the warning system issues a warning. Specifically, the warning system issues a warning when the actual cruising speed is above a predicted cruising speed determined based on the selected level of certainty percentage and a PDF, such as the one shown in FIG. 6A, generated by the online process 500 and output to the client warning system application.

FIG. 6B shows an exemplary embodiment in which the selected level of certainty is 70%. FIG. 6B is a cumulative distribution function (CDF) calculated by integrating the PDF shown in FIG. 6A from $-\infty$ to each predicted cruise speed (each value on the x axis). As such, the CDF curve shows the area under the PDF curve at each predicted cruise speed (each value on the x axis) as a percentage of the total area under the PDF curve. The predicted cruise speed at which a warning will be generated is the point on the x axis of the CDF corresponding to the selected level of certainty percentage, as shown in FIG. 6B. In other words, the client warning system application will issue a warning when there is a 70% level of certainty that a predicted cruising speed is below the actual cruising speed.

Figure 7:
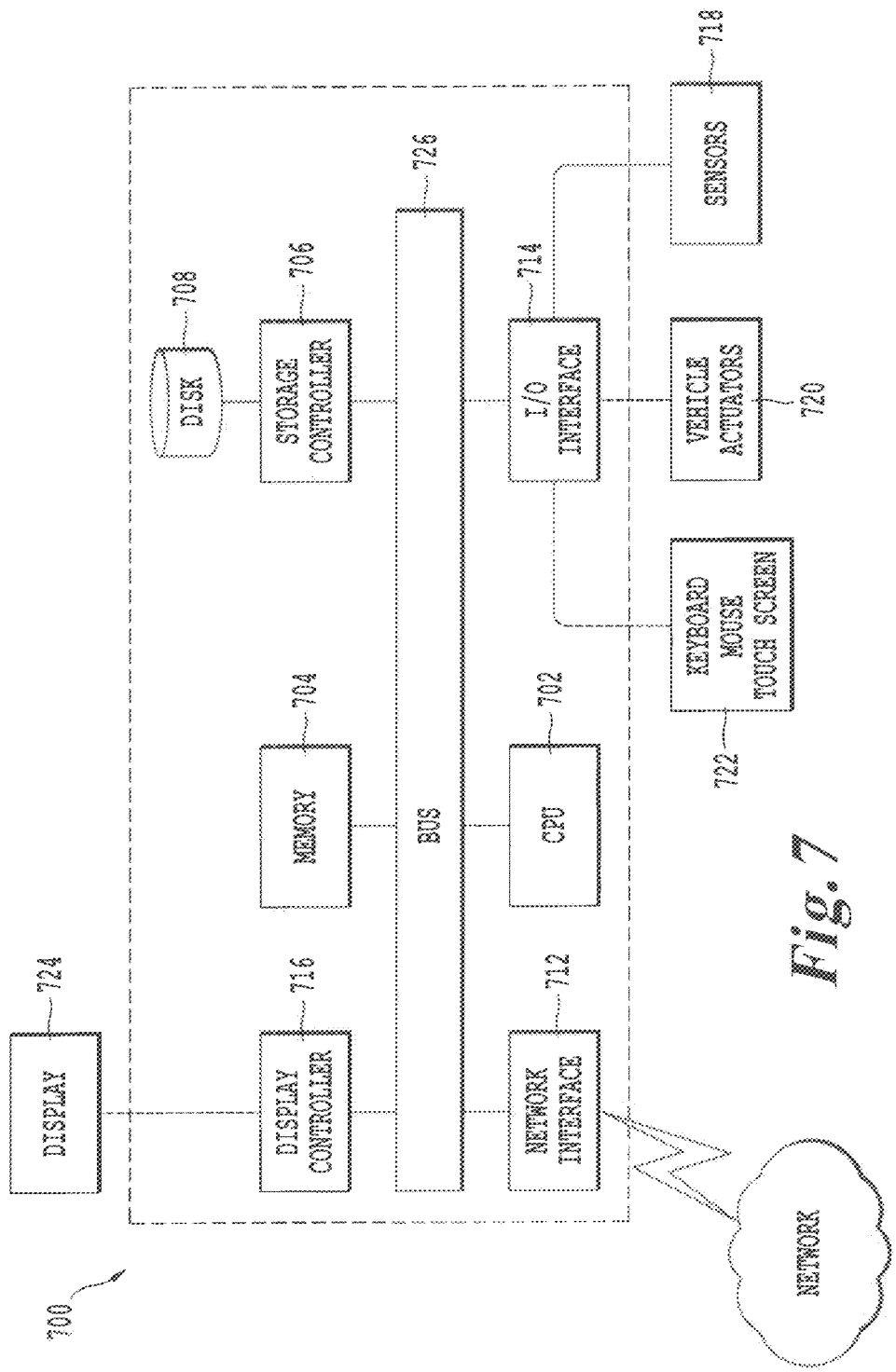
FIG. 7 is a block diagram showing hardware components of a controller.

FIG. 7 shows an exemplary structure for a controller 700. The controller 700 includes computer hardware components that are either individually programmed or execute program code stored on various recording media. In an exemplary embodiment, the controller 700 includes a central processing unit (CPU) 702, memory 704, a storage controller 706 controlling operations of a hard disk drive 708 and/or an optical disk drive (not shown), a network interface 712, an I/O interface 714 and a display controller 716. The I/O interface is connected to sensors 718, vehicle actuators 720, and user input devices such as keyboard, mouse, and/or touch screen 722. The display controller 716 is connected to a display 724. Further, the controllers shown in FIG. 7 share a common BUS 726 for transferring data, and the controllers may include application specific integrated controllers and other programmable components. The network controller allows the controller 700 to communicate via a network, such as the Internet.

In one embodiment, the network with which the controller 700 communicates through the network controller is a vehicle local area network (VLAN). Alternatively, the network may be a cellular or satellite communication network. In these embodiments, the controller 700 is an on-board component which executes all, some, or none of the processing described with respect to FIGS. 3, 4, and 5. For example, the controller 700 can perform all of the processing described above, using data, such as traffic data, collected through the network. Alternatively, the controller 700 can perform only the online process 500, while the offline process 400 is performed off-site, such as at a remote mainframe server or through cloud computing. Finally, in another embodiment, the controller 700 performs none of the processing described above with respect to FIGS. 3, 4, and 5. Instead, the controller 700 collects trajectory data and uploads the collected data to an off-site processing center, which performs the above-described processing and transmits the resulting predicted cruising speed back to the controller 700.

Obviously, numerous modifications and variations of the present disclosure are possible in light of the above teachings. It is therefore to be understood that within the scope of the applied claims, the invention may be practiced otherwise than as specifically described herein.

The invention claimed is:

1. A controller for predicting cruising speeds of a vehicle, the controller including a processor and comprising:
    a segmenting unit configured to segment trajectories of the vehicle including prior and current trajectories of the vehicle into segments including one or more cruising segments, deceleration segments, and acceleration segments;
    an extracting unit configured to extract feature data from the segments of the trajectories, the feature data including cruising speeds of the vehicle during the one or more cruising segments and predictive feature data from one or more of the cruising segments, deceleration segments, and acceleration segments that are predictive of the cruising speeds of the vehicle;
    a model generator configured to generate a probabilistic model based on the feature data from the segments of the trajectories by identifying ones of the feature data as the predictive feature data, wherein the probabilistic model associates the predictive feature data with the cruising speeds of the vehicle; and
    a predicting unit configured to predict a cruising speed of the vehicle for a target segment, which is an upcoming cruising segment of a current or subsequent trajectory of the vehicle, by conditioning the probabilistic model on real-time predictive feature data of segments of the current trajectory,
    wherein the predicting unit is configured to predict the cruising speed of the vehicle for the target segment by conditioning the probabilistic model on a sequence number of a trajectory including the target segment relative to sequential trajectories forming a navigation path of the vehicle.

2. The controller according to claim 1, wherein
the predicting unit is configured to condition the probabilistic model on a launch model of an initial segment, which is an acceleration segment, of the current trajectory, and
the target segment follows the initial segment.

3. The controller according to claim 1, further comprising an updating unit configured to update the probabilistic model based on the real-time predictive feature data and an actual cruising speed of the vehicle for the target segment.

4. The controller according to claim 3, further comprising:
a driver identification unit configured to identify a driver of the vehicle and associate the generated probabilistic model with the identified driver; and
a transmitter configured to transmit a message in response to a determination that the actual cruising speed is different by a predetermined threshold from a predicted cruising speed for the target segment based on the probabilistic model associated with the identified driver.

5. The controller according to claim 4, wherein the predetermined threshold is a statistically significant difference between the actual cruising speed and the predicted cruising speed based on the probabilistic model associated with the identified driver.

6. The controller according to claim 3, further comprising:
a vehicle identification unit configured to identify the vehicle and associate the generated probabilistic model with the vehicle; and
a transmitter configured to transmit a message in response to a determination that the actual cruising speed is different by a predetermined threshold from a predicted cruising speed for the target segment based on the probabilistic model associated with the vehicle.

7. The controller according to claim 3, wherein the updating unit is further configured to identify outlier feature data corresponding to unusual traffic patterns or unusual driving patterns and remove the identified outlier feature data from the real-time predictive feature data used to update the probabilistic model.

8. The controller according to claim 1, wherein the predicting unit is configured to predict the cruising speed of the vehicle for the target segment by conditioning the probabilistic model on a cruising speed of a cruising segment of the current trajectory, the current trajectory being a trajectory prior to a trajectory including the target segment.

9. The controller according to claim 1, wherein the predicting unit is configured to predict the cruising speed of the vehicle for the target segment by conditioning the probabilistic model on a deceleration model of a last segment of the current trajectory, the current trajectory being a trajectory prior to a trajectory including the target segment.

10. The controller according to claim 1, wherein, when an actual cruising speed for the target segment is reached by the vehicle, the controller designates an upcoming cruising segment as a next target segment for cruising speed prediction.

11. The controller according to claim 9, wherein the deceleration model is a time-based polynomial model, a state-space-based linear model, or a state-space-based non-linear model.

12. The controller according to claim 2, wherein the launch model is a time-based polynomial model, a state-space-based linear model, or a state-space-based non-linear model.

13. The controller according to claim 1, wherein
the vehicle includes a Global Positioning System (GPS) and a map database,
the feature data includes additional features, including environmental features, road geometry features, road condition features, and a road speed limit, and
the predicted cruising speed is based on a speed limit of the target segment.

14. The controller according to claim 13, wherein
the controller is configured to receive image data from a camera mounted to the vehicle, and
the controller extracts the speed limit from speed limit signs captured by the camera.

15. The controller according to claim 13, wherein the additional features include one or more of weather, road surface conditions, time of day, light level, atmospheric temperature, road inclination, radius of road curvature, and road composition.

16. The controller according to claim 1, wherein
the vehicle includes a Global Positioning System (GPS), and
the model generator generates the probabilistic model for each new road segment driven by the vehicle and associates the probabilistic model with the respective road segment.

17. The controller according to claim 1, wherein the predicted cruising speed is a probability density function.

18. The controller according to claim 17, further comprising:
a warning unit configured to integrate the probability density function to determine a cumulative distribution function, determine a cruising speed value at a user-selected certainty threshold of the cumulative distribution function, and issue a warning in response to the actual cruising speed exceeding the determined cruising speed value.

19. The controller according to claim 1, wherein the predicted cruising speed is a value.

20. The controller according to claim 1, further comprising an eco-acceleration cruise controller that receives the predicted cruising speed and determines an acceleration sequence to achieve the predicted cruising speed and maximize fuel efficiency.

21. The controller according to claim 1, wherein the model generator performs kernel density estimation, least absolute shrinkage and selection operator (LASSO) linear regression, or boosted tree regression to generate the probabilistic model.

22. The controller according to claim 1, wherein the predicting unit is further configured to predict the cruising speed for the target segment as a mean of actual cruising speeds of prior segments when no feature data has been extracted in the current trajectory.

23. The controller according to claim 1, wherein the controller outputs the predictive cruising speed to a client application.

24. A vehicle including the controller according to claim 1.

25. A method of predicting cruising speeds of a vehicle, the method comprising:
segmenting trajectories of the vehicle including prior and current trajectories of the vehicle into segments including one or more cruising segments, deceleration segments, and acceleration segments;
extracting feature data from the segments of the trajectories, the feature data including cruising speeds of the vehicle during the one or more cruising segments and predictive feature data from one or more of the cruising segments, deceleration segments, and acceleration segments that are predictive of the cruising speeds of the vehicle;

generating a probabilistic model based on the feature data from the segments of the trajectories by identifying ones of the feature data as the predictive feature data, wherein the probabilistic model associates the predictive feature data with the cruising speeds of the vehicle; and predicting a cruising speed of the vehicle for a target segment, which is an upcoming cruising segment of a current or subsequent trajectory of the vehicle, by conditioning the probabilistic model on real-time predictive feature data of segments of the current trajectory, wherein the predicting includes predicting the cruising speed of the vehicle for the target segment by conditioning the probabilistic model on a sequence number of a trajectory including the target segment relative to sequential trajectories forming a navigation path of the vehicle.

26. A non-transitory computer readable storage medium storing computer readable instructions thereon which, when executed by a computer, cause the computer to perform a method of predicting cruising speeds of a vehicle, the method comprising:

segmenting trajectories of the vehicle including prior and current trajectories of the vehicle into segments including one or more cruising segments, deceleration segments, and acceleration segments;

extracting feature data from the segments of the trajectories, the feature data including cruising speeds of the vehicle during the one or more cruising segments and predictive feature data from one or more of the cruising segments, deceleration segments, and acceleration segments that are predictive of the cruising speeds of the vehicle;

generating a probabilistic model based on the feature data from the segments of the trajectories by identifying ones of the feature data as the predictive feature data, wherein the probabilistic model associates the predictive feature data with the cruising speeds of the vehicle; and predicting a cruising speed of the vehicle for a target segment, which is an upcoming cruising segment of a current or subsequent trajectory of the vehicle, by conditioning the probabilistic model on real-time predictive feature data of segments of the current trajectory, wherein the predicting includes predicting the cruising speed of the vehicle for the target segment by conditioning the probabilistic model on a sequence number of a trajectory including the target segment relative to sequential trajectories forming a navigation path of the vehicle.

27. A cruising speed prediction system comprising:
a controller aboard a vehicle, the controller being configured to collect trajectory data of the vehicle; and
a remote processing server configured to predict cruising speeds of the vehicle based on the trajectory data of the vehicle, the remote processing server including:
  a segmenting unit configured to segment trajectories of the vehicle including prior and current trajectories of the vehicle into segments including one or more cruising segments, deceleration segments, and acceleration segments;
  an extracting unit configured to extract feature data from the segments of the trajectories, the feature data including cruising speeds of the vehicle during the one or more cruising segments and predictive feature data from one or more of the cruising segments, deceleration segments, and acceleration segments that are predictive of the cruising speeds of the vehicle;
  a model generator configured to generate a probabilistic model based on the feature data from the segments of the trajectories by identifying ones of the feature data as the predictive feature data, wherein the probabilistic model associates the predictive feature data with the cruising speeds of the vehicle; and
  a predicting unit configured to predict a cruising speed of the vehicle for a target segment, which is an upcoming cruising segment of a current or subsequent trajectory of the vehicle, by conditioning the probabilistic model on real-time predictive feature data of segments of the current trajectory, wherein
the predicting unit is configured to predict the cruising speed of the vehicle for the target segment by conditioning the probabilistic model on a sequence number of a trajectory including the target segment relative to sequential trajectories forming a navigation path of the vehicle, and
the controller transmits the collected trajectory data to the remote processing server and receives from the remote processing server the predicted cruising speed of the vehicle for the target segment.

28. The controller according to claim 1, wherein:
the extracting unit is configured to extract, in real-time for the current trajectory, a cruising speed from a cruising segment, an acceleration model from an acceleration segment, and a deceleration model from a deceleration segment; and
the predicting unit is configured to predict the cruising speed of the vehicle for the target segment based on one or more of the cruising speed from the cruising segment, the acceleration model from the acceleration segment, and the deceleration model from the deceleration segment of the current trajectory in real-time.

* * * * *